Oct. 1, 1963

J. F. MARTIN ETAL 3,105,914

HIGH SPEED BLOCKING OSCILLATOR EMPLOYING MEANS IN OUTPUT AND FEEDBACK CIRCUITS TO INCREASE REPETITION RATE

Filed Sept. 21, 1961

INVENTORS.
JOSEPH F. MARTIN
FRANK NIERTIT
BY Robert L. Nathans
ATTORNEY 3,105,914

HIGH SPEED BLOCKING OSCILLATOR EMPLOYING MEANS IN OUTPUT AND FEEDBACK CIRCUITS TO INCREASE REPETITION RATE

Joseph F. Martin, Webster, and Frank Niertit, Rochester, N.Y., assignors to General Dynamics Corporation, Rochester, N.Y., a corporation of Delaware Filed Sept. 21, 1961, Ser. No. 139,751
1 Claim. (Cl. 307—88.5)

The present invention relates to high speed blocking oscillators.

In prior art blocking oscillators, the duty cycle and frequency of the output pulse train is considerably limited due to the relatively large recovery time necessary to allow the flux built up in the transformer core during the "on" period to fall to zero during the "off" period. In addition, if the blocking oscillator is driven at a very high frequency, it is necessary for the transistor to dissipate a large amount of heat, which presents considerable problems.

Accordingly, it is the principal object of the present invention to provide a new and improved blocking oscillator which may be driven at extremely high frequencies, such as one megacycle or greater.

A further object of the present invention is to provide a new and improved blocking oscillator which produces an output pulse train having a very high duty cycle.

Further objects and advantages of the invention will become apparent as the following description proceeds and the features of novelty which characterize the invention will be pointed out with particularity in the claims annexed to and forming a part of this specification.

Figures 1, 2:
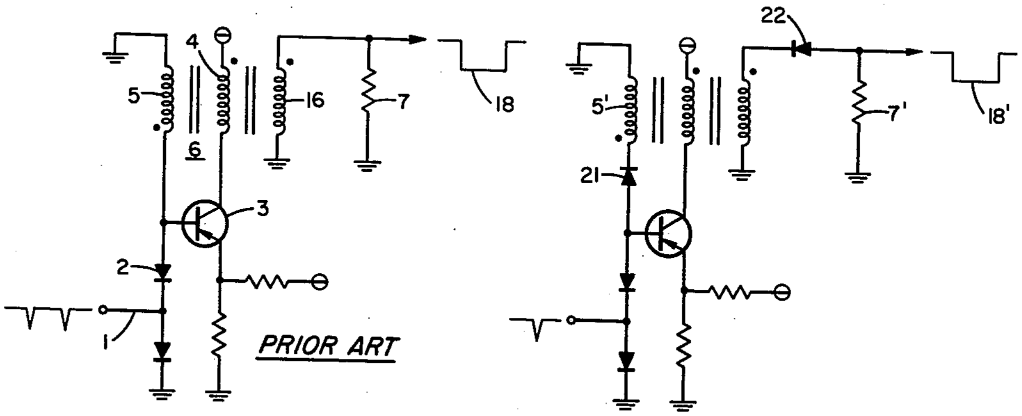

For a better understanding of the invention, reference may be had to the acompanying drawing in which:

FIGURE 1 discloses a typical prior art blocking oscillator;

FIGURE 2 discloses a preferred embodiment of the present invention; and

Figure 3:
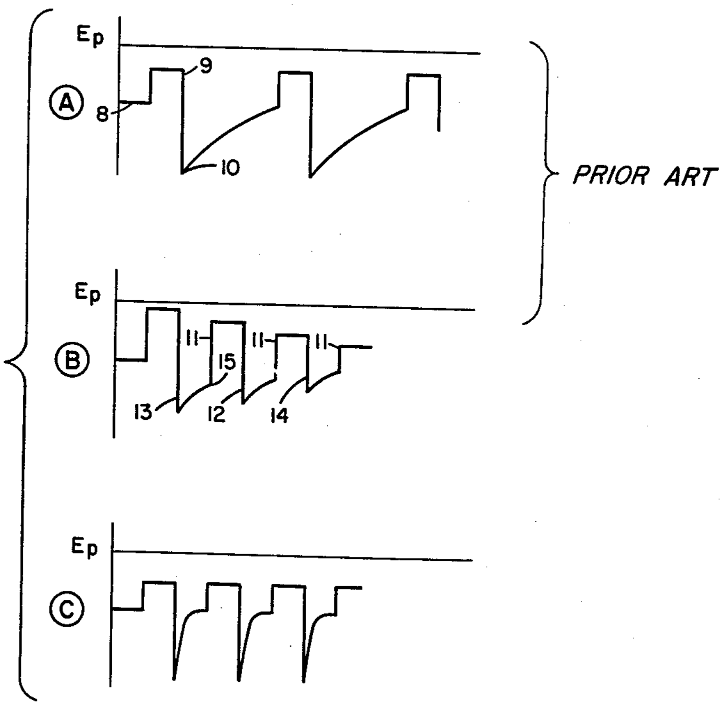

FIGURE 3 discloses certain pulse diagrams which will aid in the understanding of the present invention.

In accordance with the present invention, high speed diodes are inserted in both the feedback circuit and the output circuit of a blocking oscillator to cause these circuits to have extremely short time constants only during the relaxation, or "off" period. As a result, the oscillator recovers to the initial "off" condition very rapidly so that the blocking oscillator may be operated at a very high frequency and so that high currents do not flow through the collector of the transistor.

In a typical prior art blocking oscillator, such as shown in FIGURE 1, a negative impulse is applied to input terminal 1 of the oscillator, which impulse passes through diode 2 to cause current to flow through the collector of transistor 3. This current flow causes the base of transistor 3 to go more negative owing to the transfer of energy from collector winding 4 to winding 5 of transformer 6. This regenerative action continues until the transformer 6 becomes saturated, at which time, no further voltage is induced across winding 5 and, accordingly, the transistor is abruptly turned "off." A rectangular impulse is produced across load device 7 during the "on" period, as is well understood. The voltage wave shape of FIGURE 3A will be produced at the collector of transistor 3 under normal operating conditions. As the transistor is turned "on" by the aforementioned negative-going impulse, the B— voltage at the collector, shown at 8 in FIGURE 3A, is reduced to level 9 owing to the low impedance state of transistor 3 in the "on" condition. When the transistor is turned "off" due to the conventional regenerative action, the flux built up in the transformer core will collapse to cause the collector to go sharply negative, as indicated by point 10 in FIGURE 3A. This voltage is reduced to zero as the energy stored in the transformer is dissipated, principally in the output circuit. The succeeding input pulse is applied after level 8 is again reached, as shown.

Now let it be assumed that the blocking oscillator of FIGURE 1 is driven by a pulse train having a very high repetition rate, such as one megacycle. This will result in the production of leading edges 11, shown in FIGURE 3B, before the flux is allowed to completely collapse in the transformer core. When the transistor is turned "off" at point 13, shown in FIGURE 3B, a relatively large voltage "kick" impulse will be produced across the collector winding 4, which causes a partial collapse in the flux in the transformer core. However, at point 15 the transistor is again turned "on" as in the first cycle to again saturate the transistor. However, when the transistor is again turned "off" at point 12, the "kick" voltage produced across the collector winding will be less than the voltage produced at point 13 because the change in flux will be smaller since the oscillator is operating at a higher point on the hysteresis curve of the transformer core. In like manner, the voltage produced across the collector winding will be even smaller at point 14 than at point 12 since the change in flux will be even smaller due to still higher operation on the hysteresis curve. In other words, when the oscillator is driven as shown in FIGURE 3B, a greater amount of flux is built up in the transformer core during each "on" period than is removed during the relatively short "off" time and, accordingly, operation takes place at higher and higher points on the hysteresis curve. Since permeability decreases under this condition, the amount of energy transferred from the collector winding into the output winding of the transformer is sharply reduced so that the amplitudes of the negative-going output pulses will be reduced to an unsatisfactory level. In addition, as the operating point on the hysteresis curve is raised, the inductive reactance of collector winding 4 will progressively decrease, thereby to cause greater surges of current flow through the emitter collector circuit of the transistor. These high current surges result in the generation of a large quantity of heat which will generally burn out the transistor.

In summary, if the prior art blocking oscillators are driven at very high frequencies, the amplitudes of the output pulses will be sharply reduced to an unsatisfactory level owing to the resulting decrease in permeability of the transformer core, and the switching transistor will usually burn out due to the high current surges produced in the collector circuit.

The preferred embodiment of the present invention, shown in FIGURE 2, is similar to the oscillator of FIGURE 1 except for the inclusion of high speed diodes 21 and 22. Diode 21 is poled so that the usual regenerative action which occurs during the turn-on period and which causes the transistor to be abruptly turned "off" in the conventional manner is not affected. Impulse 18′, which is produced across load device 7′ of FIGURE 2, is similar to impulse 18, produced across load device 7 of FIGURE 1. The inclusion of high speed diode 22 in the output circuit does not affect the production of the output pulse 18′ since it is forward biased during the "on" period of the oscillator. However, when the transistor is turned "off," diodes 21 and 22 become back biased and, accordingly, the output circuit, which includes load device 7′ and high speed diode 22, and the feedback circuit, which includes transformer winding 5′ and diode 21, will both have very small time constants. It should be noted that the time constant of the aforementioned circuits is equal to L/R and since R is made very large during the "off"

period due to the back biasing of high speed diodes 21 and 22, the time constants of these circuits will be relatively small. Accordingly, the collector voltage wave shape will be altered, as shown in FIGURE 3C. As a result of the abrupt lowering of the time constants of the output and feedback circuits, the flux in the transformer core will be able to fall to zero in between "on" periods and it should be evident thta since this operation is extremely rapid, the operating frequency of the blocking oscillator of FIGURE 2 can be made quite high without the disadvantages mentioned heerinbefore in connection with the prior art blocking oscillators. It should be noted that the impedance of the collector circuit of the transistor is very high so that the time constant of this circuit will be small in any event.

To summarize briefly, the inclusion of high speed diodes 21 and 22 in the feedback and output circuits of the blocking oscillator of the present invention prevents any progressive build up of flux within the core of the transformer even though the blocking oscillator is being driven at very high frequencies. Consequently, the oscillator does not operate in the upper ranges of the hysteresis loop of the transformer core material to reduce the energy transferred to the output winding during the "on" periods of the oscillator. In addition, current surges during the "on" periods are maintained at a relatively low value so that the generation of large quantities of heat within the transistor is avoided.

The blocking oscillator of FIGURE 2 has been built and operated above one megacycle and the performance of this oscillator has been very satisfactory.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

In a blocking oscillator for producing a pulse of a given width, said oscillator including a current control device, an output circuit for withdrawing energy from said current control device, said output circuit having a first normal time constant and a feedback circuit coupled to said output circuit for feeding back a portion of the energy from said current control device to affect the control thereof, said feedback circuit having a second normal time constant, said given pulse width being determined solely by said first and second normal time constants; the combination therewith of means in said output circuit and said feedback circuit for substantially reducing the time constant of said output circuit and the time constant of said feedback circuit in response to the trailing edge of said pulse.

References Cited in the file of this patent

UNITED STATES PATENTS

| | | |
|---|---|---|
| 2,758,206 | Hamilton | Aug. 7, 1956 |
| 2,810,080 | Tronsdale | Oct. 15, 1957 |
| 2,953,694 | Wilson | Sept. 20, 1960 |
| 2,999,172 | Lawrence | Sept. 5, 1961 |
| 3,038,128 | Fischman et al. | June 5, 1962 |

OTHER REFERENCES

"Junction-Transistor Trigger Circuits," Wireless Engineer, vol. 32, No. 5, May 1955, page 128.